United States Patent
Boettcher et al.

(10) Patent No.: US 6,486,420 B1
(45) Date of Patent: Nov. 26, 2002

(54) DISCONNECTOR CONTACT DRIVE DEVICES FOR SWITCHING INSTALLATIONS WHICH SUPPLY AND DISTRIBUTE POWER

(75) Inventors: Martin Boettcher, Berlin (DE); Marcus Kampf, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/673,522

(22) PCT Filed: Mar. 31, 1999

(86) PCT No.: PCT/DE99/01061

§ 371 (c)(1),
(2), (4) Date: Apr. 9, 2001

(87) PCT Pub. No.: WO99/54974

PCT Pub. Date: Oct. 28, 1999

(30) Foreign Application Priority Data

Apr. 17, 1998 (DE) .......................... 198 17 939

(51) Int. Cl.[7] ............... H02B 11/27; H01H 9/00
(52) U.S. Cl. .................... 200/50.21; 218/84
(58) Field of Search .................... 200/50.21, 50.24; 361/604–615; 218/43, 84, 78

(56) References Cited

U.S. PATENT DOCUMENTS

| 5,481,075 A | * | 1/1966 | Kleinecke et al. | ....... 200/50.21 |
|---|---|---|---|---|
| 4,427,854 A | | 1/1984 | Kleinecke et al. | ....... 200/50.21 |
| 5,164,883 A | * | 11/1992 | Little et al. | .......... 200/50.24 X |

FOREIGN PATENT DOCUMENTS

| DE | 165 01 65 | 1/1953 |
|---|---|---|
| DE | 196 33 522 | 2/1998 |

* cited by examiner

Primary Examiner—J. R. Scott
(74) Attorney, Agent, or Firm—Kenyon & Kenyon

(57) ABSTRACT

Disconnector contact drive devices for switchgear for power supply and distribution are described, in particular for air-insulated medium-voltage switchgear, having movable pole units. In where in a first movement sequence, the disconnector contacts are separated from fixed mating contacts of the switchgear. In a second movement sequence, the pole units are displaceable to achieve the isolating distance, and the disconnect contacts are moved to disconnect them by force components acting in the x/y directions. The disconnector contact drive devices are equipped with linear guide shafts. The pole units contain pole box frames which are linearly movable along the guide shafts from an ON position stop to an OFF position stop due to the forces acting on the toggles. The toggles each have four pivot bearings. The first pivot bearing is coupled to a linear actuator shaft, the second and third pivot bearings are bearings of the toggle and the fourth pivot bearing is connected to the pole box frame The linear actuator shafts are connected to the rotary actuator shafts by corner gears.

6 Claims, 3 Drawing Sheets

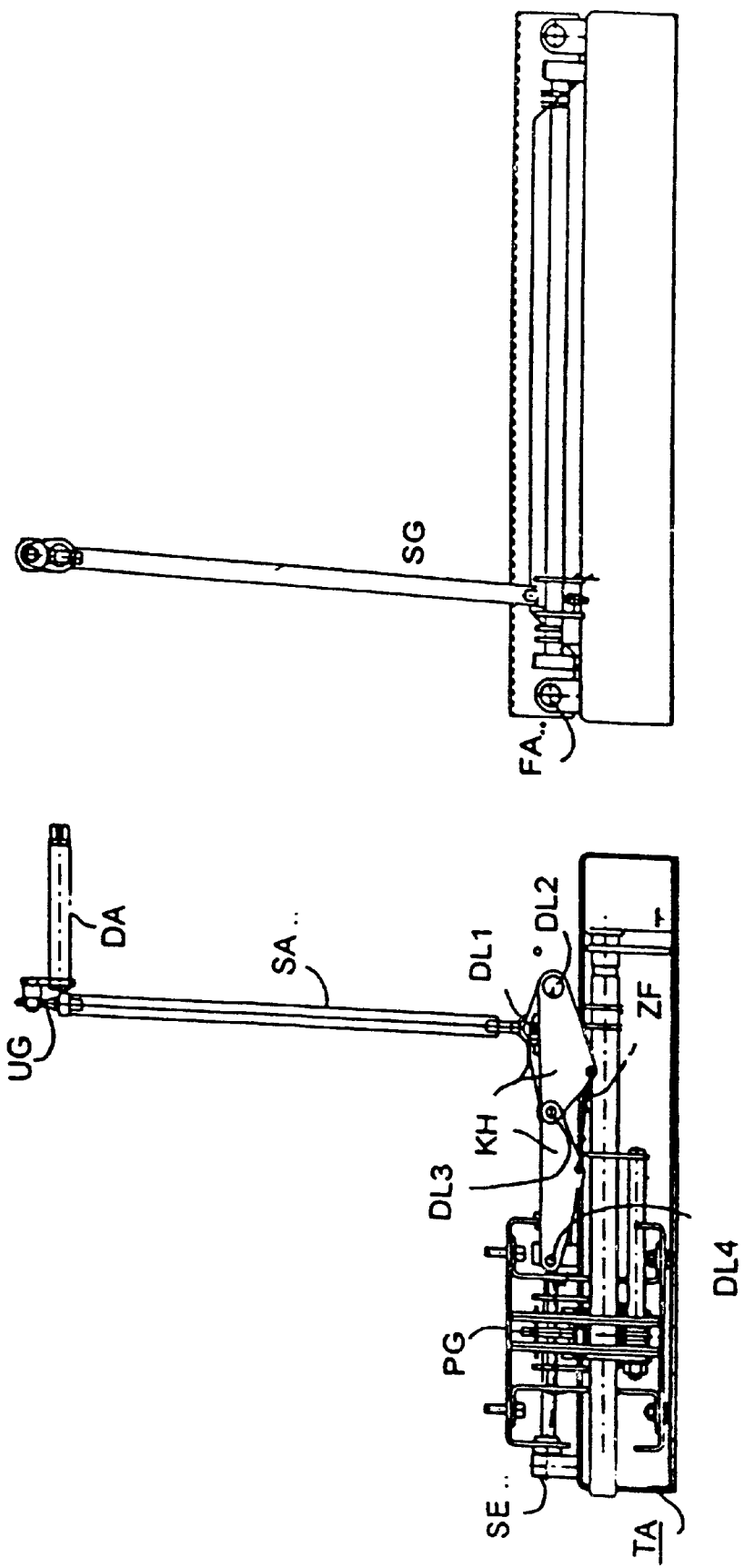

DISCONNECTOR CONTACT DRIVE DEVICES FOR SWITCHING INSTALLATIONS WHICH SUPPLY AND DISTRIBUTE POWER

FIELD OF THE INVENTION

The present invention relates to disconnector contact drive devices for switchgear for power supply,and distribution, in movable pole units, so that in a first movement sequence, the disconnector contacts are separated from fixed mating contacts of the switchgear, and in a second movement sequence, the pole units are displaceable to yield the isolating distance, and the disconnect contacts are moved to disconnect them by force components acting in the x/y directions.

BACKGROUND INFORMATION

Disconnector contact drive devices of the above-identified type are described in German Patent Application 196 33 522. In a first movement sequence, the disconnector contacts are first moved out of the area of the fixed mating contacts of the switchgear, and then in a second movement sequence they displace the entire pole units to the extent that the isolating distances required for operator safety are reached.

In conjunction with operator safety, however, there are conventional switchgear panels having additional disconnect switches whose contact gaps form the required isolating distances.

In addition, with regard to the movability of the pole units, movable inserts with disconnect contacts have also been used, where the extent of their movability is also predetermined by the required isolating distances.

SUMMARY

An object of the present invention is to provide a disconnector contact drive device which allows a compact design at minimal expense, but with which the drive energy to be expended is as low as possible and occurs largely uniformly over the entire movement process.

According to the present invention, this is achieved with the following features;

the disconnector contact drive devices are equipped with linear guide shafts, the pole units contain pole box frames which are linearly movable along the guide shafts from an ON position stop to an OFF position stop due to the forces acting on the toggles, the toggles each have four pivot bearings, with the first pivot bearing coupled to a linear actuator shaft, the second and third pivot bearings being bearings of the toggle, and the fourth pivot bearing connected to the pole box frame, and the linear actuator shafts are connected to the rotary actuator shafts by corner gears.

The pole box frames are thus moved with the movable disconnect contacts in a straight line between the switch positions ON and switch positions OFF in parallel with the guide shafts. The disconnector contact drive devices of the pole box frames having toggles designed as four-bar linkage and the linear actuator and rotary actuator shafts that work together with them are implemented by, for example gears with a non-uniform transmission ratio controlling the movement processes of the pole box frames while maintaining the required isolating distances in two stages in the shortest paths in the switchgear.

Due to the special design of the toggles with their four toggle pivot bearings in conjunction with the linear actuator and rotary actuator shafts, the loads occurring non-uniformly over the entire movement sequences, results in a largely uniform load on the drives with the gears having a non-uniform transmission ratio.

The toggles which are completely extended in the ON switch positions also define the position of the pole box frames acting symmetrically and without reaction for the drives in the retracted state. Due to the non-uniform transmission ratios, the pole box frames are not moved at the start of rotation of the drive shafts, practically in the range of approx. 15°, so that in this phase the drives can be used to control auxiliary switches so that displays of faulty state information can be triggered promptly.

The gears formed from the toggles and the linear and rotary actuator shafts thus also function in transmission of the respective drive power, with these processes taking place in two successive steps.

According to an advantageous embodiment of the present invention, the parts of the toggles that are movable about the third pivot bearing are engaged with a tension spring so that the force of the tension spring is effective in the ON position stop and in the OFF position stop.

The positions of the pole box frames in the retracted state are additionally stabilized by this measure. The tension springs also act as energy storage devices which supply increased drive forces on actuation of the disconnector contacts without any reaction effect on the actual drives and thus contribute toward further uniformization of the drive powers.

In another advantageous embodiment of the present invention, the rotary actuator shafts are each connected to a drive motor.

In this way, the disconnector contact drive devices can be controlled by motors.

In another advantageous embodiment of the present invention, the rotary actuator shafts can each be controlled by manually operable hand cranks.

Due to this measure, the rotary actuator shaft can be controlled independently of the system status of the switchgear.

In another advantageous embodiment of the present invention, provides the features:

the rotary actuator shafts are each coupled to a drive motor; and the rotary actuator shafts can be controlled by manually operable hand cranks.

Thus, the rotary actuator shafts can be driven optionally by the drive motors and the hand cranks.

BRIEF DESCRIPTION OF THE DRAWINGS

FIG. 4 illustrates the example disconnector contact drive device in an ON position.

DETAILED DESCRIPTION

Figure 1:
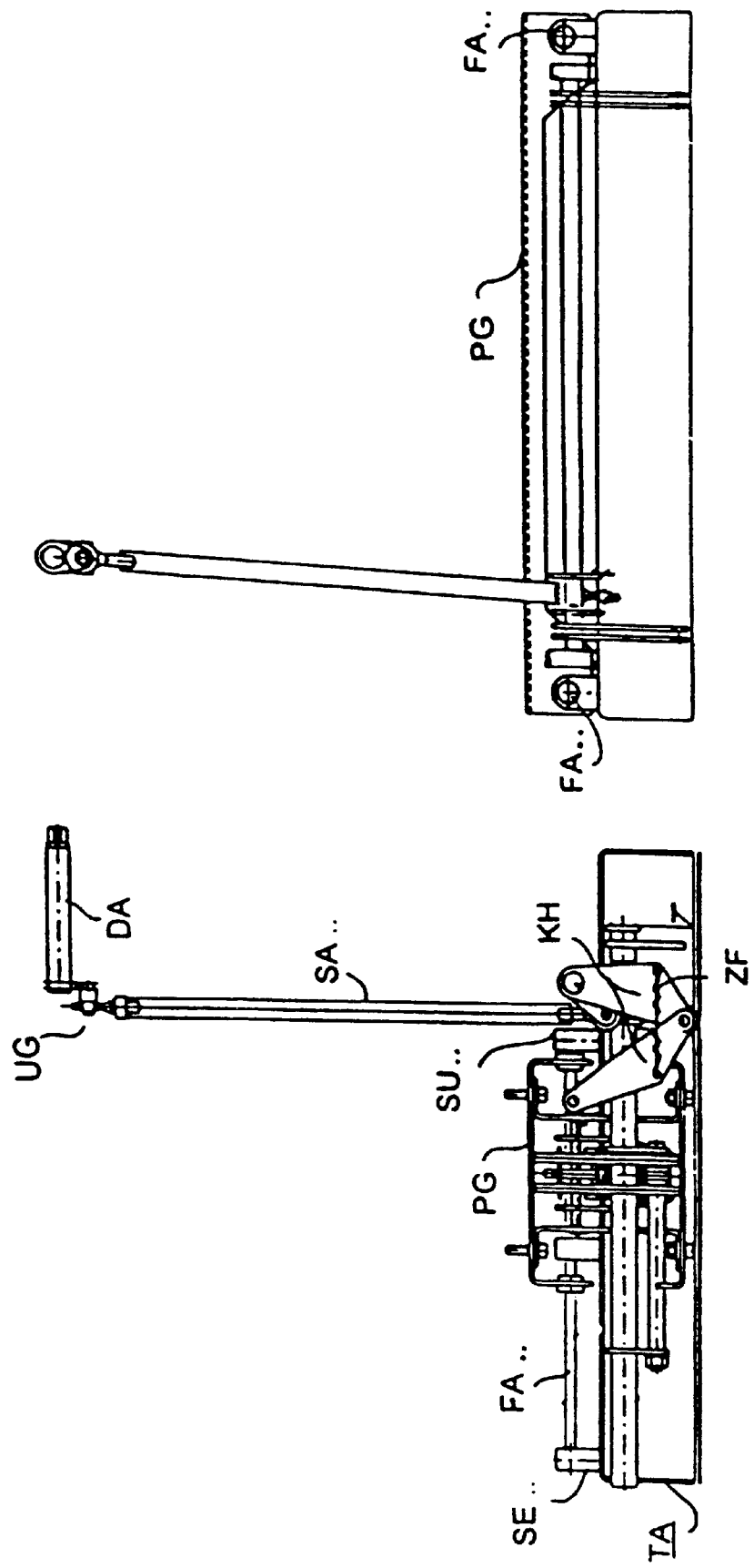
FIG. 1 illustrates an example disconnector contact drive device in an OFF position.

FIG. 1 shows the disconnector contact drive device TA in a side view (left side of FIG. 1) and in a rear front view (right side of FIG. 1) rotated by 90°. Within the disconnector contact drive device TA, guide shafts FA arranged parallel to one another are shown in a side view, on which pole box frame PG of the pole unit which is not shown completely can move in a straight line into different switch positions between the OFF position stop and the ON position stop. The movement of pole box frame PG is accomplished by a toggle KH having a total of four toggle pivot bearings DL1, DL2, DL3, DL4. The toggle is in turn, linearly controlled by a linear actuator shaft SA which is engaged by a corner gear UG with rotary actuator shaft DA. Toggle KH is connected by the first toggle pivot bearing DL1 to linear actuator shaft SA, while the second toggle pivot bearing DL2 and the third toggle pivot, bearing DL3 are bearings of toggle KH itself. The fourth toggle pivot bearing DL4 is directly engaged with pole box frame PG.

FIG. 1, shows linear actuator shaft SA. In addition, this diagram also shows the OFF position stops SU.. arranged at one side and ON position stops SE.. The pole box frame PG can be moved in a straight line in both directions (i.e., toward ON position steps SE.. and toward OFF position stop SU..).

Figure 2:
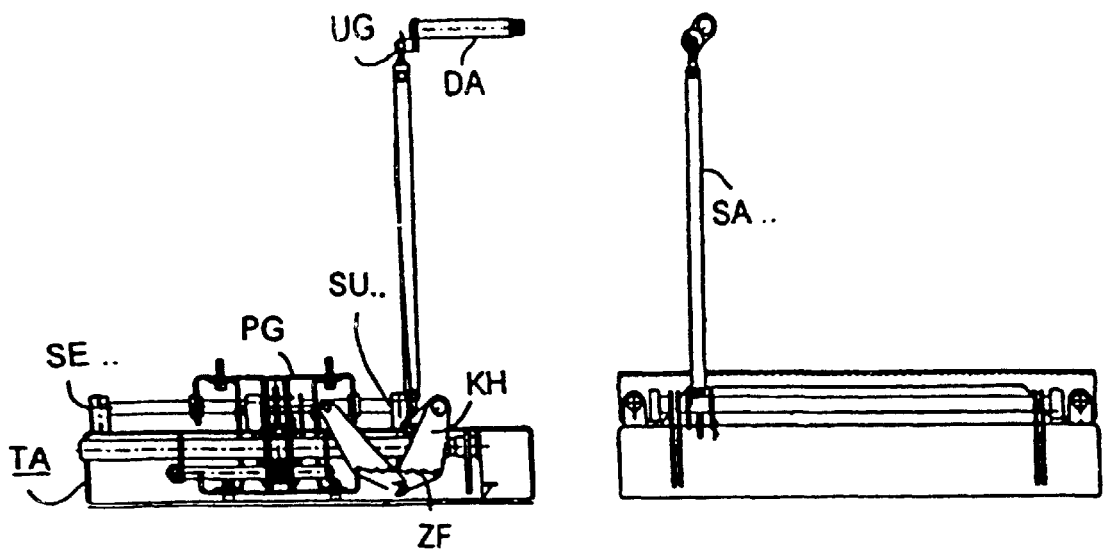
FIG. 2 illustrates an additional switch position of the example disconnector contact drive device.
Figure 3:
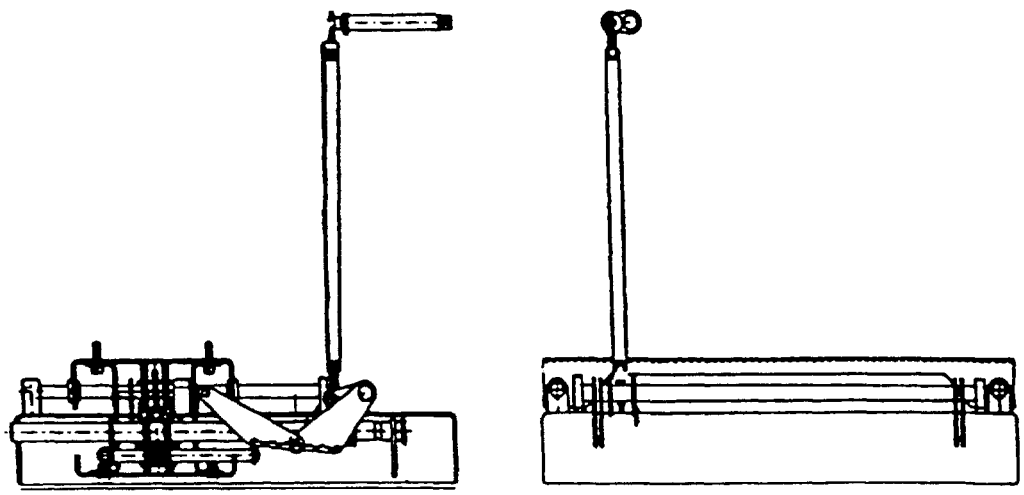
FIG. 3 illustrates an additional switch position of the example disconnector contact drive device.

FIGS. 2 and 3, illustrate the same disconnector contact drive device on a reduced scale. The reference notation used for the individual components of the disconnector contact drive device have not been shown in order to illustrate the kinematic sequences between the ON and OFF stop positions. The transitions from the switch state shown in FIG. 1—the disconnector contacts (not shown) on the pole box frame PG are not engaged with the corresponding mating contacts, (also not shown)—to the switch states in FIGS. 2 and 3, show that with the rotation of rotary actuator shaft DA, the rotational motion is translated by corner gear UG into a linear motion with which linear actuator shaft SA is deflected relatively upward. This movement sequence of linear actuator shaft SA at first leads to toggle KH being spread slightly. With an increase in the linear motion, linear actuator shaft SA causes further spreading of toggle KH against the force of tension spring ZF, which pulls the movable parts of the third toggle pivot bearing KD3 together, so that the pole box frame PG is pushed from its initial resting position to the OFF position stops in the direction of the ON position stops.

With the completely spread end position of toggle KH, illustrated at the left in FIG. 4, pole box frame PG with its discocnnect contacts (not shown) is resting against the ON position stops SE.., which amounts to complete engagement of the movable disconnector contacts in the corresponding fixed mating contacts. Tensile force is applied to tension spring ZF by the spread toggle, supporting the process of closing the disconnect contacts as an energy storage device in an advantageous manner.

The disconnector contacts are opened in a similar manner by the linear deflection of rotary actuator shaft SA in the opposite direction. Toggle KH is then returned to its original position, where the opening of the disconnect contacts toward the OFF position stop SU.. is supported by the energy storage device designed as a tension spring.

In conjunction with the disconnector contact drive device, both a motor drive and a manual drive or a combination of the two types of drives may be used. In both cases, the force is initiated through rotary actuator shaft DA.

What is claimed is:

1. A disconnector contact drive device for switchgear for power supply and distribution, comprising:

a linear guide shaft;

a pole box frame linearly movable along the guide shaft from an ON position stop to an OFF position stop, disconnector contacts being separated from fixed mating contacts in a first movement sequence of the pole box frame, the pole box frame being displaceable to achieve an isolating distance in a second movement sequence;

a rotary actuator shaft;

a linear actuator shaft coupled to the rotary actuator shaft using a corner gear; and a toggle to linearly move the pole box frame, the toggle including four pivot bearings, a first one of the yea pivot bearings being coupled to the linear actuator shaft, a second one of the pivot bearings and a third one of the pivot bearings being bearings of the toggle, and a fourth one of the pivot bearings being connected to the pole box frame.

2. The disconnector contact drive device according to claim 1, wherein the switchgear is an air-insulated medium-voltage switchgear.

3. The disconnector contact drive device according to claim 1, further comprising:

a tension spring, portions of the toggle that are moveable about the third pivot bearing being engaged with the tension spring so that a force of the tension spring is effective in the ON position stop and in the OFF position stop.

4. The disconnector contact drive device according to claim 1, wherein the rotary actuator shaft is coupled to a drive motor.

5. The disconnector contact drive device according to claim 1, wherein the rotary actuator shaft is controlled by a manually operable hand crank.

6. The disconnector contact drive device according to claim 1, wherein the rotary actuator shaft is coupled to a drive motor and the rotary actuator shaft is controlled by a manually operable hand crank.

* * * * *